United States Patent [19]
Malmendier

[11] 3,899,340
[45] Aug. 12, 1975

[54] HIGH ELASTIC MODULUS GLASS-CERAMIC ARTICLES

[75] Inventor: Joseph W. Malmendier, South Corning, N.Y.

[73] Assignee: Corning Glass Works, Corning, N.Y.

[22] Filed: Nov. 29, 1973

[21] Appl. No.: 420,106

[52] U.S. Cl. .................. 106/39.6; 65/33; 106/39.8
[51] Int. Cl. ............................................ C04b 35/04
[58] Field of Search ........ 106/47, 2, 47 R, 50, 39.6, 106/39.8

[56] References Cited
UNITED STATES PATENTS

| | | | |
|---|---|---|---|
| 2,090,098 | 8/1937 | Berger et al. ................ | 106/47 R X |
| 2,920,971 | 1/1960 | Stookey ........................ | 106/39.6 X |
| 2,996,392 | 8/1961 | Bromer et al. ................. | 106/47 Q |
| 3,044,888 | 7/1962 | Provance ...................... | 106/50 |
| 3,183,104 | 5/1965 | Thomas ......................... | 106/50 |
| 3,231,456 | 1/1966 | McMillan et al. ............. | 106/39.6 X |
| 3,252,778 | 5/1966 | Goodman et al. ............. | 106/39.8 X |
| 3,379,542 | 4/1968 | McMillan et al. ............. | 106/39.6 |
| 3,413,133 | 11/1968 | Stalego ........................ | 106/50 |
| 3,524,748 | 8/1970 | Beall ............................. | 106/39.6 |
| 3,573,078 | 3/1971 | Bacon ........................... | 106/50 X |
| 3,620,787 | 11/1971 | McMarlin ..................... | 106/50 X |
| 3,673,049 | 6/1972 | Giffen et al. .................. | 106/39.6 X |
| 3,804,646 | 4/1974 | Dumbaugh, Jr. ............. | 106/50 X |
| 3,811,901 | 5/1974 | Bacon ........................... | 106/50 |

OTHER PUBLICATIONS

Moore et al., "Study of Glasses Consisting of Oxides of Elements of Low Atomic Weight," J. Soc. Glass Tech. 40 (1956), pp. 66, 67, 72, 85, TP8455678.

"Properties of Aluminoborate Glasses of Group II Metal Oxides," Hirayama, J. Am. Cer. Soc. 44, pp. 602–606, (1961).

*Primary Examiner*—Allen B. Curtis
*Assistant Examiner*—Thomas A. Waltz
*Attorney, Agent, or Firm*—Clinton S. Janes, Jr.; Clarence R. Patty, Jr.

[57] ABSTRACT

The present invention is concerned with the production of glass-ceramic articles having compositions within the $MgO-Al_2O_3-B_2O_3$ field with, optionally, the inclusion of certain well-known high field strength modifiers, which exhibit elastic moduli in excess of $18 \times 10^6$ psi and, frequently, in excess of $22 \times 10^6$ psi. In general, the articles will consist essentially, by weight on the oxide basis, of about 5–25% $MgO$, 10–45% $Al_2O_3$, and 20–45% $B_2O_3$. The highest elastic moduli are achieved where at least 5% by weight of a high field strength modifier is also included in the composition.

6 Claims, 3 Drawing Figures

HIGH ELASTIC MODULUS GLASS-CERAMIC ARTICLES

A detailed description of the theoretical considerations and practical aspects involved in the production of glass-ceramic articles is furnished in U.S. Pat. No. 2,920,971, the basic patent in the field, and reference is hereby made thereto, for further discussion. However, in broad terms, a glass-ceramic article is derived through the controlled crystallization of a glass article. The fundamental steps of production are three: (1) a glass-forming batch, to which a nucleating agent is commonly added, is melted; (2) the melt is simultaneously cooled and a glass shape of desired geometry formed therefrom; and (3) the glass shape is heat treated in a predetermined manner to cause the glass to crystallize in situ. This heat treatment yields relatively uniformly fine-grained crystals homogeneously dispersed within a residual glassy matrix, the crystal phase comprising the predominant proportion of the article.

Inasmuch as a glass-ceramic article is produced through the crystallization in situ of a glass body, the article is free from voids and is non-porous. Furthermore, because the glass-ceramic article is predominantly crystalline, i.e., greater than 50% by weight crystalline, it will exhibit properties more closely akin to those of the crystal phase than those of either the parent glass or the residual glassy matrix. Also, of course, the residual glassy matrix of a glass-ceramic article will have a far different composition from that of the parent glass since the crystal components will have been precipitated therefrom.

In recent years there has been widespread interest in developing fibers suitable for reinforcing a broad spectrum of matrices, ranging from such common materials as cements, concretes, and plastics to exotic metals and alloys. These activities in fiberproduction have encompassed such diverse materials as metallic filaments and crystalline ceramic fibers. However, due to the relative ease of manufacture and comparative low cost of the final product, a substantial portion of the research effort has been directed in the field of glass fibers.

In the main, the prime desiderata underlying this research into fibers capable of being used as reinforcing elements in various matrices have been high mechanical strength coupled with a high elastic modulus to provide bodies demonstrating high modulus-to-density ratios. The property of elastic modulus is of vital significance in imparting resistance to flexure to prevent failure of fiber-reinforced composite bodies. It has been recognized that fibers of such materials as boron, carbon, alumina, and silicon carbide possess these characteristics but the extremely high cost of their production combined with such shortcomings inherent therein as poor resistance to oxidation and/or a pronounced tendency to react chemically with the matrix compositions have joined to render such fibers of limited practical utility.

Inasmuch as glass fibers can be manufactured in accordance with relatively conventional techniques and the fibers, themselves, are usually essentially inert to the matrix materials within which they are entrained, extensive effort has been expended to develop glasses having the proper liquidus-viscosity relationship to permit fiberization and which would demonstrate high moduli of elasticity and high modulus-to-density ratios.

The patent literature contains numerous patents directed toward glasses exhibiting high elastic moduli. Examples illustrative of such activity can be found in U.S. Pat. Nos. 2,978,341, 3,127,277, 3,183,104, 3,402,055, 3,484,259, and 3,573,078. However, each of those patents teaches the incorporation of $SiO_2$ in the composition to provide the primary network or glass-forming component. Recent research has demonstrated that higher elastic moduli can be secured in those glasses wherein $SiO_2$ is essentially absent.

U.S. Application Ser. No. 269,982, filed July 10, 1972 by the present inventor, now abandoned but refiled as a continuation-in-part application Apr. 29, 1974 under Ser. No. 464,935, is illustrative of such activity and describes glasses in the ternary system $MgO$-$Al_2O_3$-$B_2O_3$ preferably also containing a high field strength modifier such as $TiO_2$, $Ta_2O_5$, $La_2O_3$, $CeO_2$, $ZrO_2$, $Y_2O_3$, and $BeO$. The inclusion of such well-known networks formers as $SiO_2$ and $P_2O_5$, such strong fluxes as the alkali metal oxides except for $Li_2O$, and such network modifiers as the other alkaline earth metal oxides was avoided to achieve the highest elastic moduli.

Glasses in the alkaline earth metal oxide-$Al_2O_3$-$B_2O_3$ composition field are not novel per se as is evidenced by British Patent No. 708,698 and U.S. Pat. Nos. 2,090,098 and 2,996,392. Nevertheless, there is no mention therein of high elastic modulus bodies or of glass-ceramics.

The instant invention is founded upon the discovery that glass-ceramic articles having compositions within the field $MgO$-$Al_2O_3$-$B_2O_3$ with, optionally, a high field strength modifier can be produced which exhibit elastic moduli greater than $18 \times 10^6$ psi and, frequently, in excess of $22 \times 10^6$ psi. Thus, the present invention contemplates melting a batch for a glass consisting essentially, by weight, on the oxide basis, of about 5–25% $MgO$, 10–45% $Al_2O_3$, and 20–45% $B_2O_3$ with, optionally, up to 50% by weight total of a high field strength modifier selected from the group consisting of 0–10% $TiO_2$, 0–40% $Ta_2O_5$, 0–50% $La_2O_3$, 0–25% $CeO_2$, 0–10% $ZrO_2$, 0–35% $Y_2O_3$, and 0–15% $BeO$, the total $MgO + BeO$ not exceeding about 25% by weight. After a homogeneous melt has been achieved, it is simultaneously cooled below the transformation range thereof and a glass article of a desired geometry shaped therefrom. The transformation range is that temperature at which a liquid melt is deemed to have been converted to a vitreous solid and is conventionally held to lie between about the strain point and annealing point of a glass. Thereafter, the glass shape is heated to a temperature above the transformation range and, commonly, above the softening point of the glass to cause the glass to crystallize in situ to a glass-ceramic body. Finally, the crystallized article is cooled to room temperature. The identity of the crystal phases developed is dependent upon the base glass composition and the heat treatment employed in the crystallization stemp. The primary crystal phases identified have been aluminoborate and magnesium borate solid solutions. In general, the crystallization firing will be undertaken at temperatures below about 900°C. to preclude breakdown of those phases with consequent loss of elastic modulus in the final product. At temperatures below the transformation range, the viscosity of the glass is so high as to inhibit the growth of crystals.

Inasmuch as the rate of crystal development is directly dependent upon the firing temperature utilized, a short exposure time, e.g., one-half hour or less, will often be adequate to obtain very extensive crystallization at those temperatures near the hotter extreme of the crystallization range. Conversely, much longer exposure times, perhaps up to 24 hours, may be required to secure a similar degree of crystallization when temperatures near the transformation range are employed.

The final products of the instant invention are very highly crystallized, viz., greater than about 75% by volume crystalline and, commonly, in excess of 90% by volume crystalline. The crystals, themselves, appear to be homogeneously dispersed within the small amount of residual glassy matrix and quite uniform in size, i.e., normally not exceeding five microns in diameter and, preferably, not exceeding about one micron in diameter.

Figure 1:
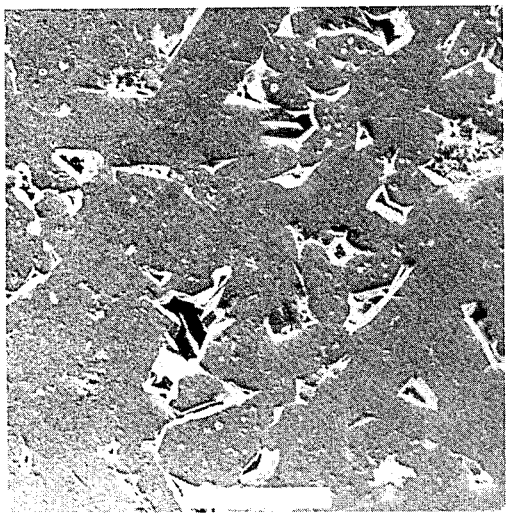
FIGS. 1 and 2 are replica electron micrographs illustrating the crystalline structure of a glass-ceramic article produced in accordance with the parameters of the invention.

Numerous process variations in the steps of production can be undertaken. For example, after the molten batch has been cooled below the transformation range and a glass article of a desired configuration formed therefrom, the article can then be further cooled to room temperature, thereby permitting visual inspection of glass quality prior to commencing the crystallization firing. However, where speed in production is a prime consideration, the melt can be simply quenched to a glass body at a temperature immediately below the transformation range and the body then reheated at once into the crystallization temperature range. Furthermore, whereas dwell periods at various individual temperatures within the crystallization range are commonly utilized as a convenience in production, that practice is not demanded for satisfactory crystal growth. Hence, the only requirement that must be observed comprises holding the glass article within the crystallization range for a period of time sufficient to achieve extensive crystal growth.

Since, as was stated above, the growth of the crystals is directly related to time and temperature, it should be recognized that the rate at which the glass body is heated above its transformation range must be carefully controlled to avoid exceeding the rate of crystal growth. Hence, adequate crystal growth must be developed to provide support for the body against deformation and slumping as the softening point of the glass body is approached and/or exceeded. Thus, heating rates of 10°C./minute have been utilized successfully, especially in those instances where some physical supporting members such as formers or setters have been employed to inhibit deformation of the glass bodies. Nevertheless, heating rates of about 3°–5°C./minute have been found to be more practical in that very little, if any, physical deformation has been observed with such values over the full composition spectrum constituting the present invention.

Table I reports several compositions, expressed in weight percent on the oxide basis, of thermally crystallizable glasses which are formed and then heat treated according to process steps of the instant invention. The actual batch ingredients employed can comprise any materials, e.g., the oxides or other compounds, which, upon being melted together, are converted to the desired oxide in the proper proportions. The batches were compounded and, except where a beryllium compound was present, ballmilled together to help in securing a homogeneous melt. Beryllium oxide and most other beryllium compounds, with the exception of beryl ore, are highly toxic. Beryl is a silicate ore and, as such, cannot be considered a practical bath material for compositions of the present invention. Therefore, care must be exercised in the production of BeO-containing glasses having compositions complying with the requirement of the instant invention. The batches were melted in closed platinum-20% rhodium crucibles for four hours at 1650°C. in an electrically-fired furnace. The melts were cast into steel molds to yield glass squares having dimensions about 5 × 5 × ½. The molds with the squares retained therein were immediately transferred to an annealer operating at the proper temperature to assure good annealing.

After removal from the annealer, the squares were visually inspected for glass quality and bars ¼ × ¼ × 4 cut therefrom to serve as test samples. That glass not withheld for measurement of physical properties, as reported in Table I, was placed within an electrically-fired furnace and heated at about 5°C./minute to the temperature reported in Table II. After the firing step, the crystallized articles were either withdrawn directly from the furnace into the ambient atmosphere or, for convenience, merely left retained within the furnace, the electric current thereto cut off, and the articles allowed to cool to room temperature therein. This latter practice, termed cooling at furnace rate, was estimated as a cooling rate averaging about 3°–5°C./minute.

That the above-defined ranges of MgO, $Al_2O_3$, and $B_2O_3$ are critical in securing glasses that can be subsequently heat treated to cause crystallization in situ is evident from a study of Table II. The following general observations can be made. Thus, where less than about 5% by weight MgO is present, the elastic modulus of the glass, as measured on the 4 inch × ¼ inch × ¼ inch bars in the conventional manner in accordance with the method set forth in ASTM Designation C 623–71, falls below about $14 \times 10^6$ psi leading to a consequent relatively low value for the glass-ceramic body of an identical composition. Where MgO in amounts greater than about 25% by weight are employed, the liquidus of the glass is at so high a temperature that conventional glass forming techniques cannot be readily utilized. Where less than about 20% $B_2O_3$ is included, the glasses become extremely difficult to form in good quality whereas, with quantities greater than about 45% by weight, the elastic modulus is very adversely affected and/or the glass becomes unstable. Further, at $Al_2O_3$ contents in excess of about 45% by weight, the liquidus of the glass becomes so high as to render conventional glass forming methods impractical and, where the $Al_2O_3$ content is less than about 10% by weight, the liquidus drops so low as to make normal glass handling techniques ineffective. Finally, whereas even a very minor addition of a high field strength modifier will provide some improvement in elastic modulus, at least 5% by weight thereof will normally be required to impart substantial benefit to the elastic modulus. The maximum values reflect the deleterious effect each can have upon the liquidus and the stability of the base glass. Thus, devitrification of the glass upon cooling from melt is undesirable. In view of that factor, the amounts of high strength modifiers which can successfully be employed, in weight percent, are as follows: 0–10% TiO₂, 0–40% Ta₂O₅, 0–50% La₂O₃, 0–25% CeO₂, 0–10% ZrO₂, 0–35% Y₂O₃, and 0–15% BeO. To insure glass stability, the total MgO + BeO ought not to exceed about 25% by weight.

TABLE I

|  | 1 | 2 | 3 | 4 | 5 | 6 | 7 | 8 | 9 | 10 | 11 |
|---|---|---|---|---|---|---|---|---|---|---|---|
| $B_2O_3$ | 40.35% | 42.98% | 43.82% | 36.04% | 37.68% | 45.18% | 41.48% | 39.56% | 38.21% | 30.09% | 35.81% |
| $Al_2O_3$ | 36.29 | 37.47 | 33.86 | 38.80 | 40.50 | 35.38 | 28.32 | 34.61 | 33.60 | 26.38 | 31.39 |
| MgO | 23.36 | 19.55 | 22.32 | 25.16 | 21.82 | 23.41 | 24.02 | 19.93 | 22.17 | 17.45 | 20.76 |
| $TiO_2$ | — | — | — | — | — | 6.03 | 6.18 | 5.90 | 6.02 | — | — |
| $Ta_2O_5$ | — | — | — | — | — | — | — | — | — | 26.08 | — |
| $CeO_2$ | — | — | — | — | — | — | — | — | — | — | 12.04 |

|  | 12 | 13 | 14 | 15 | 16 | 17 | 18 | 19 | 20 | 21 | 22 |
|---|---|---|---|---|---|---|---|---|---|---|---|
| $B_2O_3$ | 32.29% | 30.87% | 26.12% | 38.51% | 39.35% | 39.77 | 22.42% | 34.42% | 33.57% | 31.86% | 45.00% |
| $Al_2O_3$ | 28.36 | 24.82 | 14.00 | 41.31 | 42.19 | 42.67 | 13.97 | 39.72 | 27.06 | 21.48 | 28.94 |
| MgO | 18.70 | 17.87 | 15.12 | 16.70 | 11.39 | 8.62 | 15.03 | 21.39 | 19.44 | 18.42 | 26.06 |
| BeO | — | — | — | 3.48 | 7.07 | 8.94 | — | — | — | — | — |
| $TiO_2$ | — | — | — | — | — | — | 4.08 | — | — | — | — |
| $ZrO_2$ | — | — | — | — | — | — | — | 4.47 | — | — | — |
| $Y_2O_3$ | — | — | — | — | — | — | — | — | 19.93 | 28.24 | — |
| $Ta_2O_5$ | — | — | — | — | — | — | — | — | — | — | — |
| $La_2O_3$ | 20.65 | 26.44 | 44.76 | — | — | — | 44.50 | — | — | — | — |

|  | 23 | 24 | 25 | 26 | 27 | 28 | 29 | 30 | 31 | 32 |
|---|---|---|---|---|---|---|---|---|---|---|
| $B_2O_3$ | 30.16% | 27.65% | 28.34% | 33.08% | 35.14% | 24.21 | 29.20% | 28.07% | 37.44% | 45.88% |
| $Al_2O_3$ | 26.28 | 27.78 | 19.04 | 17.80 | 28.60 | 12.97 | 36.25 | 15.03 | 36.38 | 35.20 |
| MgO | 17.44 | 18.39 | 16.40 | 19.16 | 20.35 | 14.00 | 19.57 | 16.23 | 21.66 | 11.68 |
| $La_2O_3$ | — | — | 36.22 | — | — | 20.72 | — | 24.02 | — | — |
| $CeO_2$ | — | — | — | 29.96 | 15.91 | — | — | — | — | — |
| $Ta_2O_5$ | 26.12 | 26.18 | — | — | — | 28.10 | — | — | — | — |
| $Y_2O_3$ | — | — | — | — | — | — | 14.98 | 16.65 | — | — |
| $ZrO_2$ | — | — | — | — | — | — | — | — | 4.52 | — |
| BeO | — | — | — | — | — | — | — | — | — | 7.24 |

|  | 33 | 34 | 35 | 36 | 37 | 38 | 39 | 40 | 41 | 42 |
|---|---|---|---|---|---|---|---|---|---|---|
| $B_2O_3$ | 39.75% | 35.73% | 32.70% | 36.19% | 54.33% | 34.58% | 32.86% | 38.09% | 48.65% | 48.65% |
| $Al_2O_3$ | 34.75 | 38.30 | 35.05 | 38.78 | 27.53 | 42.99 | 48.12 | 33.76 | 23.19 | 12.70 |
| MgO | 23.17 | 15.48 | 14.16 | 10.47 | 18.14 | 8.69 | 19.02 | 28.15 | 28.16 | 27.13 |
| $Li_2O$ | 2.33 | — | — | — | — | — | — | — | — | — |
| ZnO | — | 10.49 | — | — | — | — | — | — | — | — |
| BaO | — | — | 18.09 | — | — | — | — | — | — | — |
| CaO | — | — | — | 14.56 | — | — | — | — | — | — |
| BeO | — | — | — | — | — | 9.00 | — | — | — | — |
| $SiO_2$ | — | — | — | — | — | 4.74 | — | — | — | — |

As noted above, the elastic modulus of each glass was measured utilizing 4 × ¼ inch × ¼ inch bars. The other physical properties of the glasses recorded in Table II were determined in accordance with techniques conventional in the glass industry.

TABLE II

| Example No. | 1 | 2 | 3 | 4 | 5 | 6 | 7 | 8 | 9 |
|---|---|---|---|---|---|---|---|---|---|
| Liquidus, °C. | 1381 | 1423 | 1342 | 1432 | 1382 | 1371 | 1245 | 1471 | 1380 |
| Softening Point, °C. | 770 | 770 | 750 | 770 | 760 | 760 | 750 | 760 | 750 |
| Annealing Point, °C. | 643 | 670 | 650 | 640 | 656 | 641 | 640 | 633 | 640 |
| Strain Point, °C. | 608 | — | — | — | 629 | 614 | — | 604 | — |
| Coefficient of Expansion (25°–300°C.) × $10^{-7}$/°C. | 53.6 | 51.8 | 53.3 | 55.3 | 52.3 | 56.1 | 56.7 | 52.4 | 53.9 |
| Density, g/cm³ | 2.612 | 2.584 | 2.585 | 2.63 | 2.635 | 2.689 | 2.657 | 2.658 | 2.673 |
| Elastic Modulus (× $10^6$ psi) | 14.94 | 14.46 | 14.72 | 15.13 | 15.21 | 15.73 | 14.99 | 15.05 | 15.67 |
| Elastic Modulus/ Density (× $10^6$ psi) | 5.72 | 5.60 | 5.68 | 5.75 | 5.77 | 5.83 | 5.64 | 5.66 | 5.86 |

| Example No. | 10 | 11 | 12 | 13 | 14 | 15 | 16 | 17 | 18 |
|---|---|---|---|---|---|---|---|---|---|
| Liquidus, °C. | 1319 | 1389 | 1313 | 1309 | 1380 | — | 1407 | — | 1271 |
| Softening Point, °C. | 770 | 745 | 750 | 760 | 720 | — | 755 | 750 | 730 |
| Annealing Point, °C. | 650 | 650 | 630 | 633 | 624 | — | 690 | 675 | 632 |
| Strain Point, °C. | — | — | — | 606 | 599 | — | — | — | 608 |

TABLE II — Continued

| Example No. | 1 | 2 | 3 | 4 | 5 | 6 | 7 | 8 | 9 |
|---|---|---|---|---|---|---|---|---|---|
| Coefficient of Expansion (25°–300°C.) × $10^{-7}$/°C. | 53.1 | 52.4 | 60.5 | 63.7 | 77.7 | — | 48.5 | — | 80.6 |
| Density, g/cm³ | 3.208 | 2.841 | 3.428 | 3.155 | 3.699 | 2.634 | 2.620 | 2.589 | 3.786 |
| Elastic Modulus (× $10^6$ psi) | 16.29 | 15.39 | 15.76 | 15.63 | 16.15 | 16.37 | 17.33 | 19.52 | 17.49 |
| Elastic Modulus/Density (× $10^6$ psi) | 5.08 | 5.40 | 5.20 | 4.95 | 4.40 | 6.21 | 6.61 | 7.54 | 4.62 |

| Example No. | 19 | 20 | 21 | 22 | 23 | 24 | 25 | 26 |
|---|---|---|---|---|---|---|---|---|
| Liquidus, °C. | — | 1361 | — | 1260 | — | — | — | — |
| Softening Point, °C. | 720 | 770 | 760 | 760 | — | 760 | 745 | 715 |
| Annealing Point, °C. | 630 | 650 | 670 | 640 | — | 650 | 640 | 630 |
| Strain Point, °C. | — | 620 | — | — | — | — | — | — |
| Coefficient of Expansion (25°–300°C.) × $10^{-7}$/°C. | — | 70.9 | — | — | — | — | — | — |
| Density, g/cm³ | 3.391 | 2.977 | 3.144 | 2.581 | 3.198 | 3.243 | 2.707 | 3.236 |
| Elastic Modulus (× $10^6$ psi) | 15.80 | 16.88 | 18.15 | 14.09 | 16.00 | 17.37 | 15.85 | 15.65 |
| Elastic Modulus/Density (×$10^6$ psi) | 4.66 | 5.67 | 5.77 | 5.46 | 5.00 | 5.34 | 5.86 | 4.84 |

| Example No. | 27 | 28 | 29 | 30 | 31 | 32 | 33 | 34 |
|---|---|---|---|---|---|---|---|---|
| Liquidus, °C. | — | — | — | — | — | — | — | — |
| Softening Point, °C. | 745 | 750 | 770 | 740 | 760 | 780 | — | 730 |
| Annealing Point, °C. | 645 | 640 | 650 | 650 | 650 | 670 | — | — |
| Strain Point, °C. | — | — | — | — | — | — | — | — |
| Coefficient of Expansion (25°–300°C.) × $10^{-7}$/°C. | — | — | — | — | — | — | — | — |
| Density, g/cm³ | 2.911 | 3.156 | — | 3.512 | 2.686 | 2.562 | 2.588 | 2.783 |
| Elastic Modulus (× $10^6$ psi) | 15.46 | 15.52 | — | 17.79 | 16.17 | 17.17 | 14.57 | 15.77 |
| Elastic Modulus/Density (× $10^6$ psi) | 5.31 | 4.92 | — | 5.07 | 6.02 | 6.70 | 5.63 | 5.667 |

| Example No. | 35 | 36 | 37 | 38 | 39 | 40 | 41 | 42 |
|---|---|---|---|---|---|---|---|---|
| Liquidus, °C. | — | — | 1270 | — | — | — | — | — |
| Softening Point, °C. | 750 | 740 | 760 | — | — | — | — | — |
| Annealing Point, °C. | — | — | 636 | (Devitrified | During | Forming | to a | Glass) |
| Strain Point, °C. | — | — | 601 | — | — | — | — | — |
| Coefficient of Expansion (25°–300°C.) × $10^{-7}$/°C. | — | — | — | — | 51.2 | — | — | — |
| Density, g/cm³ | 2.863 | 2.639 | 2.488 | — | — | — | — | — |
| Elastic Modulus (× $10^6$ psi) | 13.07 | 13.98 | 13.6 | — | — | — | — | — |
| Elastic Modulus/Density (× $10^6$ psi) | 4.565 | 5.297 | 5.466 | | | | | |

Table II points out the need for maintaining the amounts of MgO, Al₂O₃, and B₂O₃ within the indicated effective proportions low elastic moduli and/or melting and forming problems. Hence, Example 37 reflects the adverse effect upon modulus and Examples 39–42 devitrified upon cooling from the melt thereby demonstrating their inability to be shaped utilizing conventional glass forming methods. Examples 34–36 and 38 illustrate the very deleterious effect upon elastic modulus and/or other properties which additions of ingredients other than MgO, Al₂O₃, B₂O₃, and the high field strength modifiers can bring about. Therefore, the total of all such additions should not exceed about 10% by weight with the preferred practice including none or certainly not more than about 5% by weight total.

Table III reports heat treatments applied to Examples 1–5, 22, and 33 to convert the glass articles to glass-ceramics. The Table also lists elastic moduli measured on 4 × ¼ inch × ¼ inch rods in like manner to that recited above for the glass rods, densities determined in the conventional manner, and the crystal phases developed as identified through X-ray diffraction analysis.

TABLE III

| Example No. | Heat Treatment | Elastic Modulus (×$10^6$ psi) | Density (g/cm³) | Elastic Modulus/Density (×$10^6$ psi) | Crystal Phases |
|---|---|---|---|---|---|
| 1 | 30 minutes at 650°C. | 15.72 | 2.608 | 6.03 | None |
| 1 | 30 minutes at 700°C. | 15.41 | 2.608 | 5.91 | None |
| 1 | 30 minutes at 750°C. | 20.70 | 2.650 | 7.81 | 2Al₂O₃·B₂O₃, Mg₂B₂O₅ |
| 1 | 1 minute at 800°C. | — | — | — | 9Al₂O₃·2B₂O₃, Mg₂B₂O₅ |
| 1 | 30 minutes at 800°C. | 19.42 | 2.631 | 7.38 | 9Al₂O₃·2B₂O₃, Mg₂B₂O₅ |
| 1 | 30 minutes at 825°C. | 20.34 | 2.636 | 7.72 | 9Al₂O₃·2B₂O₃, Mg₂B₂O₅ |
| 1 | 30 minutes at 850°C. | 19.18 | 2.633 | 7.28 | 9Al₂O₃·2B₂O₃, Mg₂B₂O₅ |
| 2 | 30 minutes at 650°C. | 15.58 | 2.582 | 6.03 | None |
| 2 | 30 minutes at 700°C. | 15.10 | 2.588 | 5.83 | None |
| 2 | 30 minutes at 750°C. | 21.35 | 2.643 | 8.08 | 2Al₂O₃·B₂O₃, Mg₂B₂O₅ |
| 2 | 1 minute at 800°C. | — | — | — | 9Al₂O₃·2B₂O₃, Mg₂B₂O₅ |
| 2 | 30 minutes at 800°C. | 19.66 | 2.619 | 7.51 | 9Al₂O₃·2B₂O₃, Mg₂B₂O₅ |
| 2 | 30 minutes at 825°C. | 19.63 | 2.612 | 7.52 | 9Al₂O₃·2B₂O₃, Mg₂B₂O₅ |
| 2 | 30 minutes at 850°C. | 19.48 | 2.609 | 7.47 | 9Al₂O₃·2B₂O₃, Mg₂B₂O₅ |

TABLE III — Continued

| Example No. | Heat Treatment | Elastic Modulus ($\times 10^6$ psi) | Density (g/cm³) | Elastic Modulus/Density ($\times 10^6$ psi) | Crystal Phases |
|---|---|---|---|---|---|
| 3 | 30 minutes at 650°C. | 15.04 | 2.578 | 5.83 | None |
| 3 | 30 minutes at 700°C. | 15.10 | 2.588 | 5.83 | None |
| 3 | 30 minutes at 750°C. | 20.32 | 2.582 | 7.87 | $2Al_2O_3 \cdot B_2O_3$, $9Al_2O_3 \cdot 2B_2O_3$, $Mg_2B_2O_5$ |
| 3 | 1 minute at 800°C. | 21.11 | 2.578 | 8.19 | $9Al_2O_3 \cdot 2B_2O_3$, $Mg_2B_2O_5$ |
| 3 | 30 minutes at 800°C. | 20.82 | 2.552 | 8.16 | $9Al_2O_3 \cdot 2B_2O_3$, $Mg_2B_2O_5$ |
| 3 | 1 minute at 825°C. | 20.94 | 2.582 | 8.11 | $9Al_2O_3 \cdot 2B_2O_3$, $Mg_2B_2O_5$ |
| 3 | 30 minutes at 825°C. | 20.63 | 2.559 | 8.06 | $9Al_2O_3 \cdot 2B_2O_3$, $Mg_2B_2O_5$ |
| 3 | 1 minute at 850°C. | 21.86 | 2.583 | 8.46 | $9Al_2O_3 \cdot 2B_2O_3$, $Mg_2B_2O_5$ |
| 3 | 30 minutes at 850°C. | 20.94 | 2.553 | 8.20 | $9Al_2O_3 \cdot 2B_2O_3$, $Mg_2B_2O_5$ |
| 4 | 30 minutes at 650°C. | 16.02 | 2.648 | 6.05 | None |
| 4 | 30 minutes at 700°C. | 15.77 | 2.644 | 5.96 | None |
| 4 | 30 minutes at 750°C. | 23.89 | 2.743 | 8.71 | $2Al_2O_3 \cdot B_2O_3$, $Mg_2B_2O_5$ |
| 4 | 30 minutes at 800°C. | 21.23 | 2.625 | 8.09 | $9Al_2O_3 \cdot 2B_2O_3$, $Mg_2B_2O_5$ |
| 4 | 30 minutes at 825°C. | 21.79 | 2.716 | 8.02 | $9Al_2O_3 \cdot 2B_2O_3$, $Mg_2B_2O_5$ |
| 4 | 30 minutes at 850°C. | 22.59 | 2.710 | 8.34 | $9Al_2O_3 \cdot 2B_2O_3$, $Mg_2B_2O_5$ |
| 5 | 30 minutes at 650°C. | 16.02 | 2.631 | 6.09 | None |
| 5 | 30 minutes at 700°C. | 15.85 | 2.630 | 6.03 | None |
| 5 | 30 minutes at 750°C. | 21.56 | 2.668 | 8.08 | $2Al_2O_3 \cdot B_2O_3$, $Mg_2B_2O_5$ |
| 5 | 30 minutes at 775°C. | — | — | — | $2Al_2O_3 \cdot 2B_2O_3$, $Mg_2B_2O_5$ |
| 5 | 1 minute at 800°C. | — | — | — | $9Al_2O_3 \cdot 2B_2O_3$, $Mg_2B_2O_5$ |
| 5 | 30 minutes at 800°C. | 22.36 | 2.638 | 8.48 | $9Al_2O_3 \cdot 2B_2O_3$, $Mg_2B_2O_5$ |
| 5 | 30 minutes at 825°C. | 22.63 | 2.642 | 8.57 | $9Al_2O_3 \cdot 2B_2O_3$, $Mg_2B_2O_5$ |
| 5 | 30 minutes at 850°C. | 21.44 | 2.643 | 8.10 | $9Al_2O_3 \cdot 2B_2O_3$, $Mg_2B_2O_5$ |
| 22 | 30 minutes at 650°C. | 15.57 | 2.602 | 5.98 | None |
| 22 | 30 minutes at 700°C. | 15.06 | 2.587 | 5.82 | None |
| 22 | 30 minutes at 750°C. | 15.66 | 2.658 | 5.89 | $9Al_2O_3 \cdot 2B_2O_3$ (trace only) |
| 22 | 1 minute at 800°C. | 15.41 | 2.584 | 5.96 | None |
| 22 | 30 minutes at 800°C. | 15.35 | 2.585 | 5.94 | $9Al_2O_3 \cdot 2B_2O_3$ (trace only) |
| 22 | 1 minute at 825°C. | 14.97 | 2.585 | 5.79 | None |
| 22 | 30 minutes at 825°C. | 15.90 | 2.594 | 6.13 | $9Al_2O_3 \cdot 2B_2O_3$ (trace only) |
| 22 | 1 minute at 850°C. | 15.64 | 2.596 | 6.02 | None |
| 22 | 30 minutes at 850°C. | 18.77 | 2.584 | 7.26 | $9Al_2O_3 \cdot 2B_2O_3$, $Mg_2B_2O_5$ |
| 33 | 30 minutes at 650°C. | 17.74 | 2.553 | 6.95 | None |
| 33 | 30 minutes at 700°C. | 17.62 | 2.549 | 6.91 | None |
| 33 | 30 minutes at 750°C. | 20.76 | 2.577 | 8.06 | $9Al_2O_3 \cdot 2B_2O_3$ |
| 33 | 1 minute at 800°C. | — | — | — | $9Al_2O_3 \cdot 2B_2O_3$, $Mg_2B_2O_5$ |
| 33 | 30 minutes at 800°C. | 18.26 | 2.605 | 7.01 | $9Al_2O_3 \cdot 2B_2O_3$, $Mg_2B_2O_5$ |
| 33 | 30 minutes at 825°C. | 18.23 | 2.606 | 7.00 | $9Al_2O_3 \cdot 2B_2O_3$, $Mg_2B_2O_5$ |
| 33 | 30 minutes at 850°C. | 17.22 | 2.602 | 6.62 | $9Al_2O_3 \cdot 2B_2O_3$, $Mg_2B_2O_5$ |

Figure 2:
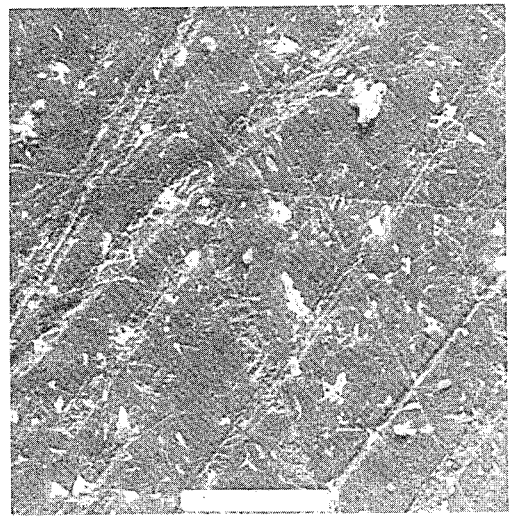

Table III acts to confirm a statement made above that the rate at which the glass crystallizes in situ is a function of time and temperature. Hence, at lower temperatures within the effective range, i.e., temperatures in the vicinity of the transformation range of the glass, relatively long periods of time will be required to achieve extensive crystallization whereas, at temperatures within the hotter extreme of the effective range, only a few minutes may suffice. FIGS. 1 and 2 pictorially illustrate this feature. Hence, FIG. 1 is a replica electron micrograph illustrating the microstructure of Example 5 after the glass had been subjected to a temperature of 800°C. for 15 minutes. A comparison can be made with FIG. 2 which comprises a replica electron micrograph depicting the microstructure of Example 5 after heat treating the glass for about 2 hours at 850°C. As can be observed, the body is essentially completely crystalline. The white bar at the base of each micrograph represents one micron.

Table III also points up the fact that, through modifications in heat treatment and composition, various aluminoborate and magnesium boroate crystal phases can be developed. The fraction of crystallinity will also, of course, be dependent upon the heat treatment, as shown in FIGS. 1 and 2. The maximum possible fractions of such crystal phase can be calculated from the compositions. For example, where Example 5 is crystallized at 750°C.:

|  | Mole Fraction | Weight Fraction |
|---|---|---|
| $2Al_2O_3 \cdot B_2O_3$ | 0.366 | 0.543 |
| $Mg_2B_2O_5$ | 0.500 | 0.407 |
| $B_2O_3$ (residual) | 0.133 | 0.051 | where Example 5 is crystallized at 850°C.:

|  | Mole Fraction | Weight Fraction |
|---|---|---|
| $9Al_2O_3 \cdot 2B_2O_3$ | 0.089 | 0.466 |
| $Mg_2B_2O_5$ | 0.544 | 0.407 |
| $B_2O_3$ (residual) | 0.368 | 0.127 |

Figure 3:
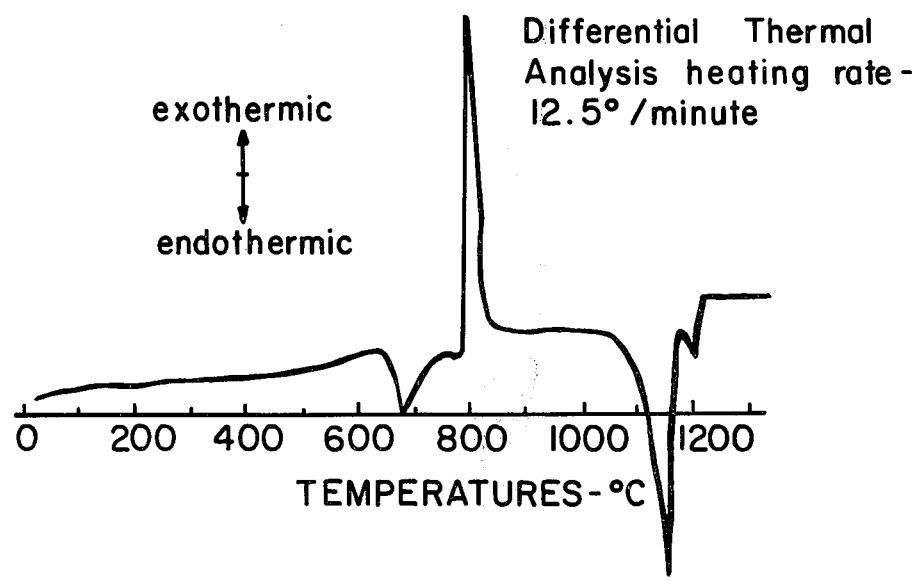
FIG. 3 is a thermograph resulting from a differential thermal analysis of the crystallization in situ phenomenon taking place in a glass having a composition within the field of the invention.

FIG. 3 is a thermograph resulting from a differential thermal analysis conducted on Example 5 wherein a heating rate of about 12.5°C./minute was employed. An exothermic process is seen to begin at about 685°C. with a change in shape near 700°C. and a maximum at about 765°C. The highly pronounced peak beginning at about 785°C. indicates extensive crystallization beginning at that temperature. That behavior appears to be typical for many compositions within the above-described glass ranges, especially with regard to the start of a large exothermic peak at about 785°C.

I claim:

1. A glass-ceramic article demonstrating an elastic modulus greater than about $18 \times 10^6$ psi consisting essentially of crystals of aluminoborate and/or magnesium borate solid solutions homogenously dispersed in a glassy matrix, which crystals comprise at least 75% by volume of said article, the composition of said article being substantially the same throughout and consisting essentially, by weight on the oxide basis, of about 5–25% MgO, 10–45% $Al_2O_3$, and 20–45% $B_2O_3$.

2. A glass-ceramic article according to claim 1 wherein said composition also contains up to 50% by weight of a high field strength modifier selected from the group in the indicated proportion of 0–10% $TiO_2$, 0–40% $Ta_2O_5$, 0–50% $La_2O_5$, 0–25% $CeO_2$, 0–10% $ZrO_2$, 0–35% $Y_2O_3$, and 0–15% BeO, the total MgO + BeO not exceeding about 25% by weight.

3. A glass-ceramic article according to claim 2 wherein said composition contains at least 5% by weight of said high field strength modifiers.

4. A method for making a glass-ceramic article demonstrating an elastic modulus greater than about $18 \times 10^6$ psi consisting essentially of crystals of aluminoborate and/or magnesium borate solid solutions homogeneously dispersed in a glassy matrix, said crystals constituting at least 75% by volume of said article, which comprises the steps of:

a. melting a batch for a glass consisting essentially, by weight on the oxide basis, of about 5–25% MgO, 10–45% $Al_2O_3$, and 20–45% $B_2O_3$;

b. simultaneously cooling the melt below the transformation range thereof and shaping a glass body therefrom;

c. thereafter subjecting said glass body to a temperature above the transformation range but below about 900°C. for a period of time sufficient to crystallize said glass body in situ throughout; and then d. cooling the crystallized body to room temperature.

5. A method according to claim 4 wherein said glass body also contains up to 50% by weight of a high field strength modifier selected from the group in the indicated proportion of 0–10% $TiO_2$, 0–40% $Ta_2O_5$, 0–50% $La_2O_5$, 0–25% $CeO_2$, 0–10% $ZrO_2$, 0–35% $Y_2O_3$, and 0–15% BeO, the total MgO + BeO not exceeding about 25% by weight.

6. A method according to claim 5 wherein said glass body contains at least 5% by weight of said high field strength modifiers.

* * * * *